United States Patent [19]

Matsuzaki et al.

[11] Patent Number: 5,649,243
[45] Date of Patent: Jul. 15, 1997

[54] PHOTOMETRIC DEVICE AND METHOD

[75] Inventors: Makoto Matsuzaki, Kanagawa-ken; Yoshiharu Inoue, Tokyo, both of Japan

[73] Assignee: Nikon Corporation, Tokyo, Japan

[21] Appl. No.: 468,666

[22] Filed: Jun. 6, 1995

[30]  Foreign Application Priority Data

Sep. 7, 1994 [JP] Japan ................... 6-214093

[51] Int. Cl.[6] .................. G03B 7/08; G03B 7/099
[52] U.S. Cl. .......................... 396/233; 396/271
[58] Field of Search ................. 354/432, 465, 354/429, 478, 476; 396/233, 271

[56]  References Cited

U.S. PATENT DOCUMENTS

| | | | |
|---|---|---|---|
| 3,860,936 | 1/1975 | Harvey | 354/51 |
| 4,035,815 | 7/1977 | Takahashi | 354/53 |
| 4,146,379 | 3/1979 | Numata et al. | 354/53 |
| 4,681,420 | 7/1987 | Suda et al. | 354/409 |
| 5,504,553 | 4/1996 | Takagi | 354/415 |

*Primary Examiner*—Russell E. Adams
*Assistant Examiner*—Eric Nelson
*Attorney, Agent, or Firm*—Oliff & Berridge

[57]  ABSTRACT

A photometric device that makes improved accuracy of screen photometry possible is disclosed. The photometric device includes a screen component that transmits a luminous flux from a subject field, a light emitting indicating device that is placed in the vicinity of the screen component and that indicates light emitting photographic information, and a photometry component that receives the transmitted luminous flux and outputs the received luminous flux as a first photometric value of the subject field. The photometric device is equipped with an adjustment device that determines a second photometric value based on a higher order or non-linear function of the first photometric value that differs from the first photometric value by a photometric value adjustment amount to compensate for the emitted light of the light emitting indicating device.

20 Claims, 3 Drawing Sheets

PHOTOMETRIC DEVICE AND METHOD

BACKGROUND OF THE INVENTION

1. Field of the Invention

The present invention relates to photometric devices that receive a luminous flux from a subject field and particularly to photometric devices for use with cameras.

2. Description of Related Art

It has been proposed to equip cameras with screen photometry to perform photometry by transmitting luminous flux from the subject field through a screen. Sometimes a light emitting indicating device that indicates light emitting photographic information is placed in the vicinity of the screen.

When a light emitting indicating device is provided in the vicinity of the screen, when performing screen photometry, a significant amount of light emitted from the light emitting indicating device mixes with the luminous flux from the subject field. Because of this, the photometric value output from the photometry device includes the output due to light originally emitted from the light emitting indicating device. The relative effect of this light emitting indicating device related output increases as the subject field gets darker.

For this reason, adjustment of the photometric value is performed to eliminate the luminance effect of the light emitted from the light emitting indicating device. The photometry device is divided into several areas and the luminance effect due to the light emitting indicating device is different for each of the photometric areas.

Heretofore, with photometry devices, as indicated in FIG. 4, the light receiving plane was divided into six areas. A light emitting indicating device 4', for example, a liquid crystal indicator that includes a back light illumination component 5', was placed at the bottom portion of the photometry device. A light sensor with photometry areas divided into 6 sections was used. With the center section 11a' designated ch 1, the left top periphery section 11b' designated ch 2, the right top periphery section 11c' designated ch 3, the left bottom periphery section 11d' designated ch 4, the right bottom periphery section 11e' designated ch 5, and the spot section 11f' designated ch 6, the bottom portions of the areas for ch 4 and ch 5 receive the greatest effect of the light emitted from the light emitting indicating device. Therefore, the calculation for the adjusted photometric value is performed for the upper portions by formula (1) and for the bottom portions by formula (2) that follow.

$$\text{ch 1-3, 6 } BVn = BVn/4 + (11/12) \quad (1)$$

$$\text{ch 4, 5 } BVn = BVn/2 + (11/6) \quad (2)$$

where BVn is the photometric value.

However, using the above mentioned method of adjustment, because the change is large when adjustment is made, the accuracy of the adjustment of the photometric value in relation to the actual subject field luminance value becomes only approximate so that there is a problem of poor accuracy of the photometric device when performing screen photometry.

SUMMARY OF THE INVENTION

It is an object of the present invention to solve the above and other problems by providing a photometric device with improved accuracy of screen photometry. The photometric device of the invention uses a higher order, or non-linear, function to adjust the photometric value output based on the received luminous flux.

The photometric device of the present invention has a screen component that transmits the luminous flux from the subject field, a light emitting display device that is placed in the vicinity of the screen component and that indicates light emitting photographic information, and a photometry component that receives the transmitted luminous flux and outputs the received luminous flux as a first photometric value of the subject field. The photometric device is equipped with an adjustment device that accomplishes adjustments based upon a higher order or nonlinear function of the first photometric value to determine a second photometric value that differs from the first photometric value by a photometric value adjustment amount to compensate for the luminance effect of the emitted light of the light emitting display device. The photometric device may use a logarithmic function as the higher order function.

The photometry component performs photometry by dividing the subject field into several areas, and the adjustment device 6 adjusts each photometric value related to each area independently. In this way, appropriate adjustment can be performed with good accuracy for each and every photometric area.

A prohibition device may prohibit adjustment by the adjustment device when there is little luminance effect from the light emitting display device due to the large output of the photometry component. In this way, high efficiency of adjustment can be achieved.

The prohibition device prohibits the adjustment of the adjustment device when the first photometric value is greater than a predetermined amount because the adjustment would have little effect and is therefore unnecessary.

BRIEF DESCRIPTION OF THE DRAWINGS

An embodiment of a photometric device of the present invention is described hereafter, using a camera as an example, with reference to the drawings, in which.

DETAILED DESCRIPTION OF PREFERRED EMBODIMENTS

Figure 1:
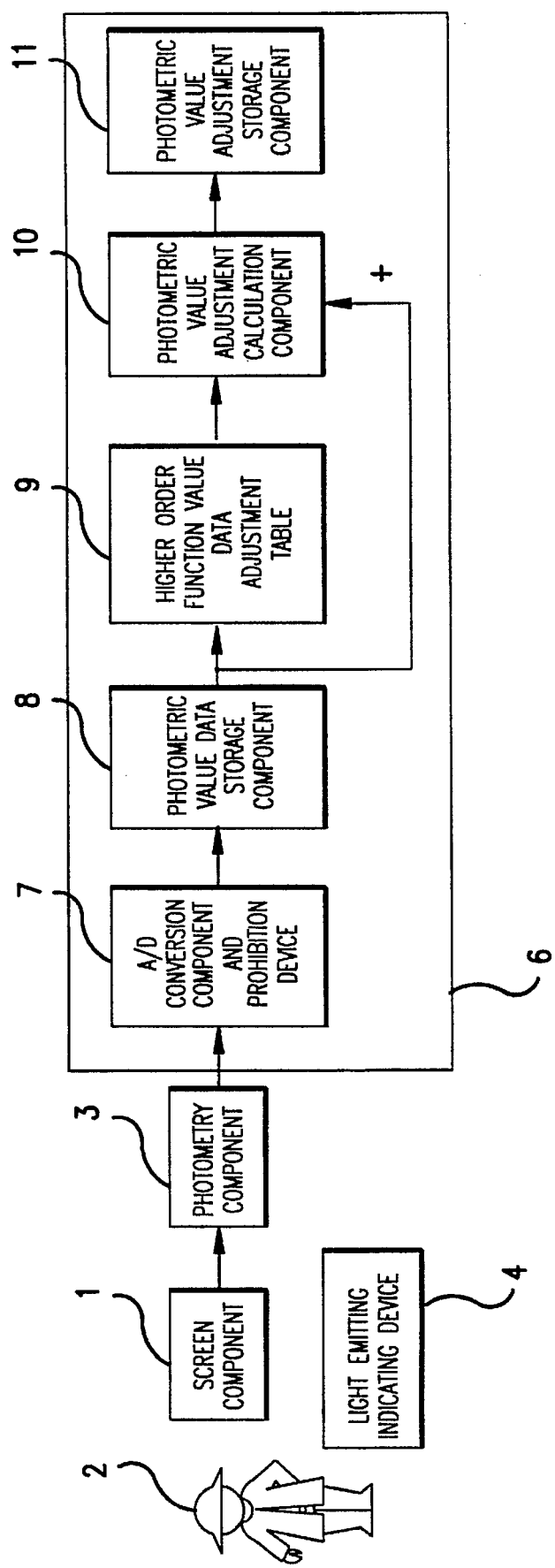
FIG. 1 is a block diagram of a photometric device according to the present invention.

FIG. 1 is a block diagram of a photometry device of a camera performing photometric value adjustment in accordance with the present invention. The screen component 1 transmits the luminous flux from the subject 2 and directs the transmitted luminous flux to the photometry component 3.

Figure 2:
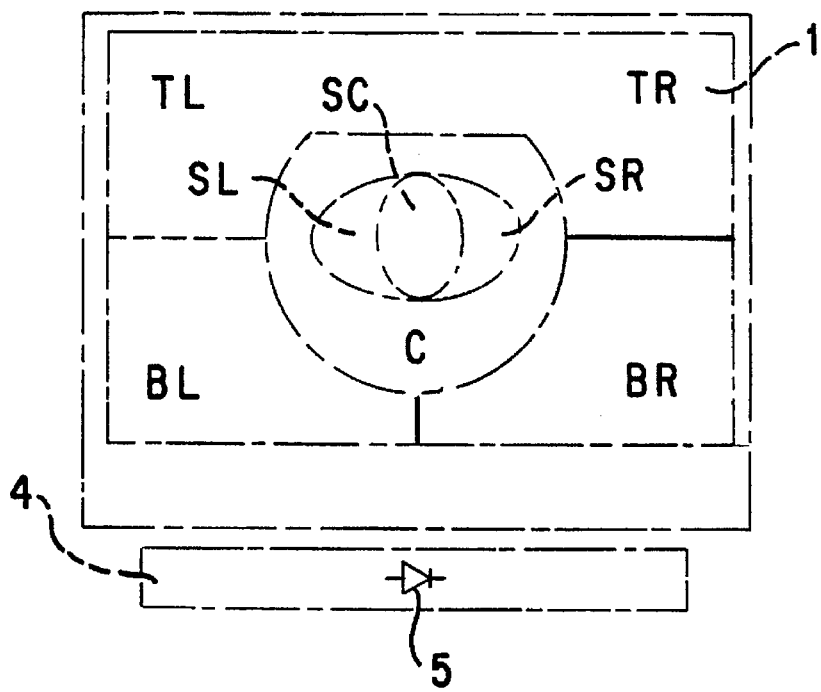
FIG. 2 is a front view of a screen component and a light emitting indicating device according to the present invention.

As shown in FIG. 2, a light emitting display device 4 which is a liquid crystal indicator is placed at the bottom of the screen component 1 and indicates photographic information. Because the finder component (not shown in the diagram) is generally dark, the liquid crystal indicator 4 indicates photographic information by way of a switch, not shown. As illustrated in FIG. 2, the liquid crystal indicator 4 includes a back light illuminator component 5 which performs the light emission.

Returning to FIG. 1, photometry component 3 includes both a light sensor component and a photometric value output component. The photometry component receives the luminous flux from the subject 2 that was transmitted from the screen component 1, converts the luminous flux to an electrical signal by photoelectric conversion, and outputs this photoelectric converted luminous flux as a first photometric value of subject 2 as analogue data to the adjustment device 6 which is a microcomputer (MCU).

The light sensor component is divided into eight portions at its light receiving plane. The photometry component determines a first photometric value for each portion for processing as indicated below.

The MCU 6 is constructed from an A/D conversion component at 7, a photometric value data storage component 8, higher order function value data adjustment table 9, photometric value adjustment calculation component 10, and photometry adjustment value table storage component 11.

The A/D conversion component at 7 of FIG. 1 converts the first photometric value output from photometry component 3 into sequential digital signals. A photometric value data storage component 8 stores the digital signal converted by the A/D conversion component at 7 of FIG. 1.

Higher order function value data adjustment table 9 holds the higher order function value data adjustments related to the photometric values of the subject 2.

Photometric value adjustment calculation component 10 subtracts the photometric value that the higher order function value data adjustment table 9 is holding from the photometric value stored in the photometric value data storage component 8 to determine an adjusted or second photometric value.

Photomerry adjustment value data storage 11 stores the calculation results of photometric value adjustment calculation component 10 as the second photometry value. Because the other structural components of the camera used in this embodiment are consistent with known cameras, an explanation of them will be omitted. The function of this embodiment will be explained hereafter.

Figure 4:
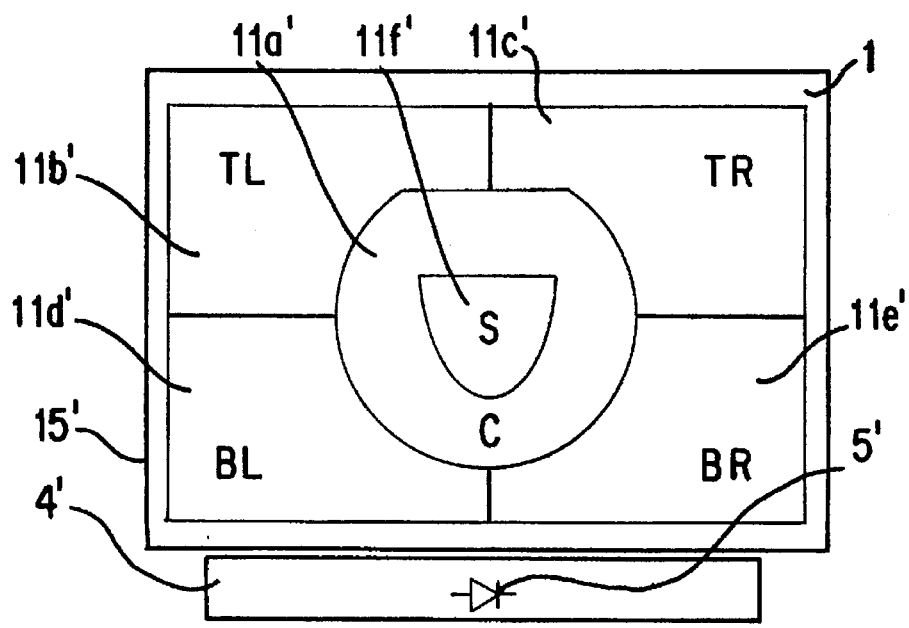
FIG. 4 is a front view of a light emitting indicating device and screen component according to the related art.

As stated above, the light sensor component is divided into eight segments (C, TL, TR, BL, BR, SC, SL, SR). When the back light illuminator 5 of the liquid crystal indicator 4 emits light, both segment BL and segment BR, as shown in FIG. 4, have their photometric values increased. Because that increase due to the luminance effect of back light illuminator component 5 of the liquid crystal indicator 4 has a correlation with a higher order function according to the brightness of subject 2, for this embodiment, as described hereafter, a logarithmic function is used as a higher order function to determine adjusted or second photometric values.

The photometric value adjustment calculation component 10 calculates an adjusted or second photometric value Bvn' of the 6 areas (C, TL, TR, SC, SL, SR), so that the effect of the back light illuminator component 5 is minimized, by way of the following formula (3).

$$Bvn'=BVn-(1/e^{-(-6-BVn)})\times K1 \qquad (3)$$

Except, $(1/e-(-p6-BVn)) \leq 1$

Here, BVn is the first photometric value according to each area (C, TL, TR, SC, SL, SR) output from the photometry component 3, $1/e^{-(-6-Bvn)} \times K1$ is the adjustment value held by higher order function value data adjustment table 9, and K1 is a proportion constant.

In addition, the photometric value adjustment calculation component 10 calculates the adjustment photometric value BVn' of both areas, segment BL and segment BR, where the effect of the back light illuminator component 5 is great, by way of the following formula (4).

$$Bvn'=BVn-(1/e^{-(-6-BVn)})\times K2 \qquad (4)$$

where K2 is a proportion constant.

In this embodiment, the adjusted value derived from formulas (3) and (4) is set from a data table set in ⅙ ev increments. Accordingly, it is accurate to about ⅙ ev.

Figure 3:
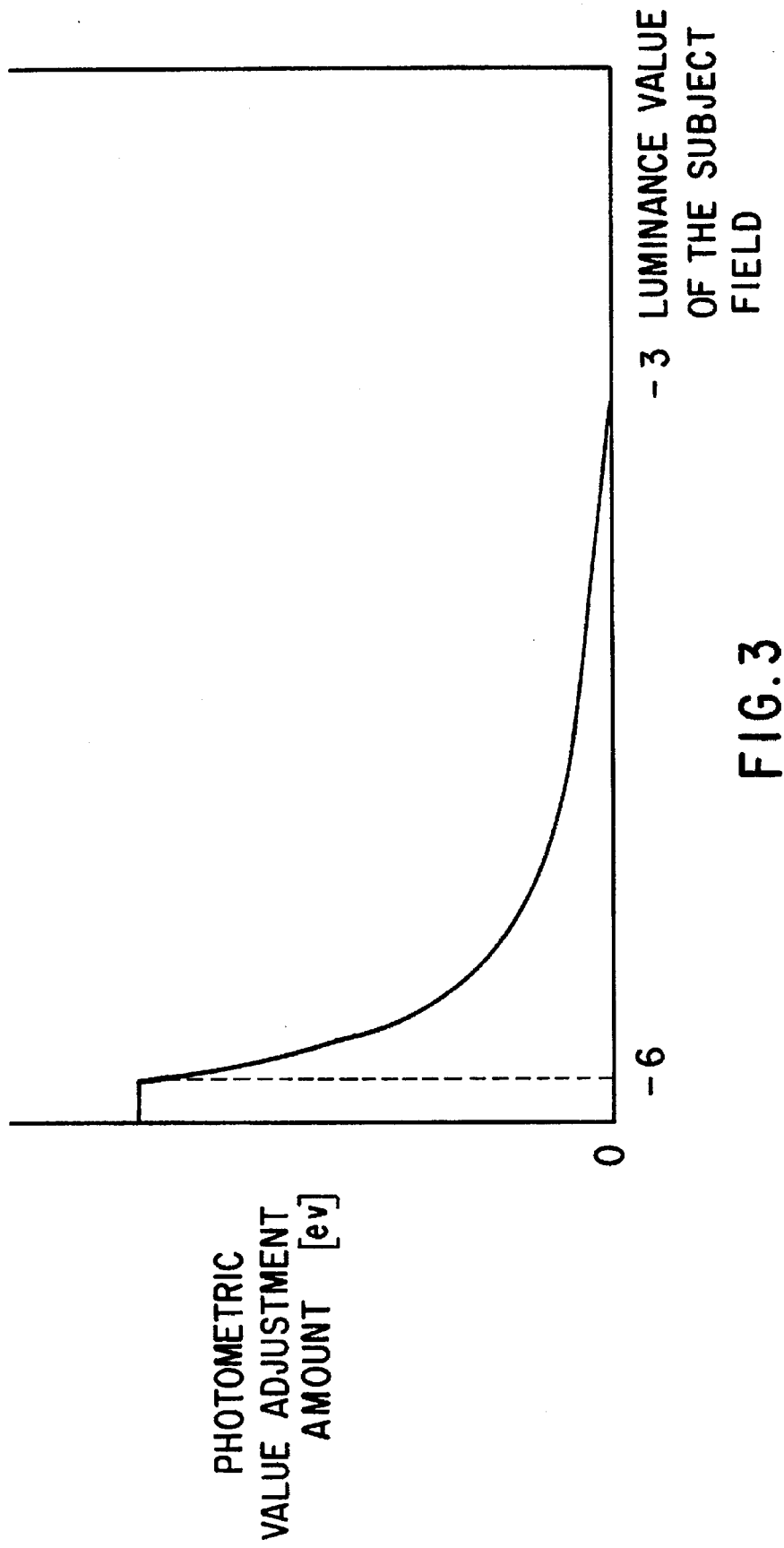
FIG. 3 is a graph of a photometric value adjustment amount of a back light illuminator component versus the luminance value of the subject field according to the present invention.

The graph of FIG. 3 shows the experimentally derived luminance effect of back light illuminator component 5 of the liquid crystal indicator 4 in terms of the photometric value adjustment amount required for different luminance values of the subject field. The graph shows a correlation with a higher order function.

A prohibition device, shown at 7 of FIG. 1 with the A/D converter, prevents the photometric value adjustment calculation component 10 from performing adjustment calculations when the photometric value from the photometric value data storage component 8 is larger than a predetermined value. The predetermined value being the photometric value when the luminance effect from the back light illuminator component 5 on photometry component 3 is too small relatively to be a problem.

The liquid crystal indicator 4 can be placed anywhere in the vicinity of screen component 1, not necessarily at the bottom portion of screen component 1.

With photometric device of the present invention, the accuracy of the photometric adjustment is improved by adjusting the photometric value using a higher order function for adjustment. The photometric device of the present invention may improve the accuracy of adjustment by the use of a logarithmic function as the higher order function.

The photometry device may adjust the difference in photometric values independently for each area. In this way, appropriate adjustment can be performed with good accuracy for each and every photometric area.

The prohibition device may prevent photometric adjustment when there is little difference. In this way, high efficiency of the adjustment can be achieved.

While this invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention as defined in the following claims.

What is claimed is:

1. A photometric device comprising:

a screen component to transmit a luminous flux from a subject field;

a light emitting indicating device that is placed in the vicinity of said screen component to indicate light emitting photographic information;

a photometry component to receive the luminous flux from the subject field and from said light emitting indicating device, to determine a first photometric value of the subject field by photoelectric conversion of said received luminous flux, and to output said first photometric value; and an adjustment device to receive said output first photometric value and to determine a second photometric value based on a higher order function of said output first photometric value to compensate for the luminance effect of said light emitting indicating device on said first photometric value.

2. A photometric device according to claim 1, wherein said higher order function is a logarithmic function.

3. A photometric device according to claim 2, wherein said photometry component includes a light sensor that is divided into a plurality of sensing portions, said photometry component determines a said output first photometric value for each of said plurality of sensing portions, and said adjustment device determines a said second photometric value for each sensing portion based on a corresponding said output first photometric value.

4. A photometric device according to claim 3, further comprising a prohibition device to prevent determination of a said second photometric value by said adjustment device when a corresponding said output first photometric value is larger than a predetermined value.

5. A photometric device according to claim 1, wherein said photometry component includes a light sensor that is divided into a plurality of sensing portions, said photometry component determines a said output first photometric value for each of said plurality of sensing portions, and said adjustment device determines a said second photometric value for at least one of said plurality of sensing portions based on a corresponding said output first photometric value.

6. A photometric device according to claim 1, further comprising a prohibition device to prevent determination of a said second photometric value by said adjustment device when a corresponding said output first photometric value is larger than a predetermined value.

7. A photometric device according to claim 1, wherein said light emitting indicating device comprises a liquid crystal indicator that includes a back light illuminator component.

8. A photometric device according to claim 1, wherein said adjustment device comprises a microcomputer.

9. A photometric device according to claim 8, wherein said microcomputer includes a higher order function value data adjustment table to provide a photometric value adjustment amount corresponding to said output first photometric value for use in determining said second photometric value.

10. A photometric device according to claim 9, wherein said microcomputer determines said second photometric value based on subtracting said photometric value adjustment amount from a quantity corresponding to said output first photometric value.

11. A photometric device comprising:

a screen component that transmits a luminous flux from a subject field;

light emitting means that is placed in the vicinity of said screen component for indicating light emitting photographic information;

photometry means for receiving the luminous flux from the subject field and said light emitting means, for determining a first photometric value of the subject field by photoelectric conversion of said received luminous flux, and for outputting said first photometric value; and adjustment means for receiving said output first photometric value and for determining a second photometric value based on a higher order function of said output first photometric value to compensate for the luminance effect of said light emitting means on said first photometric value.

12. A photometric device according to claim 11, wherein said higher order function is a logarithmic function.

13. A photometric device according to claim 12, wherein said photometry means includes light sensing means for sensing light in a plurality of sensing portions, said photometry means determines a said output first photometric value for each of said plurality of sensing portions, and said adjustment means determines a said second photometric value for at least one of said plurality of sensing portions based on a corresponding said output first photometric value.

14. A photometric device according to claim 13, further comprising prohibition means for preventing determination of a said second photometric value by said adjustment means when a corresponding said output first photometric value is larger than a predetermined value.

15. A photometric device according to claim 11, wherein said light emitting means comprises a liquid crystal indicator that includes a back light illuminator component.

16. A photometric device according to claim 11, wherein said adjustment means provides a photometric value adjustment amount corresponding to said output first photometric value for use in determining said second photometric value.

17. A method of screen photometry for determining a photometric value of the luminous flux of a subject field, comprising the steps of:

(a) transmitting a luminous flux from a subject field through a screen component;

(b) emitting light from a light emitting device that is placed in the vicinity of said screen component;

(c) receiving the luminous flux from said subject field and said light emitting device;

(d) determining a first photometric value of the subject field by photoelectric conversion of said received luminous flux;

(e) determining a higher order function of said first photometric value; and (f) determining a second photometric value based on said higher order function of said first photometric value to compensate for the luminance effect on said first photometric value of said light emitting device.

18. A method of screen photometry according to claim 17, wherein said determining step (e) comprises determining a logarithmic function.

19. A method of screen photometry according to claim 18, further comprising performing steps (a) through (f) for each of a plurality of areas of said subject field to determine a plurality of first photometric values and a plurality of second photometric values, wherein each of said plurality of second photometric values corresponds to a different one of said plurality of first photometric values.

20. A method of screen photometry according to claim 19, further comprising the steps of:

(g) comparing each of said plurality of first photometric values to a predetermined value; and (h) performing steps (e) and (f) only for first photometric values that are less than said predetermined value.

* * * * *